United States Patent [19]
Guimbretiere

[11] Patent Number: 5,713,797
[45] Date of Patent: Feb. 3, 1998

[54] UNIVERSAL JOINT HAVING ARMS OF A TRIPOD INTERACTING WITH TRACKS OF AN OUTER JOINT MEMBER THROUGH TWO DIFFERENT INTERMEDIATE MEMBERS

[75] Inventor: Pierre Louis Guimbretiere, Neauphle-Le-Chateau, France

[73] Assignee: GKN Automotive AG, Lohmar, Germany

[21] Appl. No.: 597,514

[22] Filed: Feb. 2, 1996

[30] Foreign Application Priority Data

Feb. 2, 1995 [FR] France ................... 95 01232

[51] Int. Cl.$^6$ ........................... F16D 3/22
[52] U.S. Cl. ............ 464/111; 464/120; 464/141; 464/167; 464/905
[58] Field of Search .................. 464/111, 120, 464/122, 167, 905, 141, 906

[56] References Cited

U.S. PATENT DOCUMENTS

| | | | |
|---|---|---|---|
| 2,559,108 | 7/1951 | Boge, Sr. et al. | |
| 2,898,749 | 10/1959 | Parkman | |
| 3,381,497 | 5/1968 | Allen | 464/122 |
| 3,478,538 | 11/1969 | Heimler | 464/141 |
| 4,291,552 | 9/1981 | Orain | |
| 4,582,501 | 4/1986 | Girguis | 464/111 |
| 4,582,502 | 4/1986 | Girguis | |
| 4,741,723 | 5/1988 | Orain | 464/120 X |
| 4,828,534 | 5/1989 | Orain | 464/111 |
| 4,878,881 | 11/1989 | Van Dest | |
| 4,881,923 | 11/1989 | Orain | 464/111 |
| 4,954,120 | 9/1990 | Kobayashi | 464/141 |
| 4,988,327 | 1/1991 | Orain | |
| 5,019,016 | 5/1991 | Uchman | |
| 5,061,223 | 10/1991 | Kadota et al. | 464/111 |
| 5,135,438 | 8/1992 | Poulin et al. | |
| 5,184,978 | 2/1993 | Filmore | |
| 5,254,038 | 10/1993 | Schneider | |
| 5,290,202 | 3/1994 | Orain | 464/111 |

FOREIGN PATENT DOCUMENTS

| | | |
|---|---|---|
| 0 206 886 | 6/1986 | European Pat. Off. |
| 0 429 326 A1 | 10/1990 | European Pat. Off. |
| 0 477 074 A1 | 9/1991 | European Pat. Off. |
| 1012081 | 7/1952 | France |
| 2 506 872 | 6/1981 | France |
| 2 512 140 | 8/1982 | France |
| 2 592 106 | 6/1987 | France |
| 2 622 653 | 10/1987 | France |
| 2 628 803 | 9/1989 | France |
| 23 31 033 | 1/1975 | Germany |
| 44 10 724 A1 | 3/1994 | Germany |
| 61-266830 | 11/1986 | Japan |
| 63-92822 | 4/1988 | Japan ................... 464/141 |
| 3-168416 | 7/1991 | Japan |
| 5-321942 | 12/1993 | Japan |
| 2 106 219 | 6/1982 | United Kingdom |
| 2 199 113 | 6/1988 | United Kingdom |
| 2 210 952 | 6/1989 | United Kingdom |
| 2 236 164 | 3/1991 | United Kingdom |
| WO91/16549 | 10/1991 | WIPO |
| WO92/15797 | 9/1992 | WIPO |

*Primary Examiner*—Eileen A. Dunn
*Attorney, Agent, or Firm*—Wenderoth, Lind & Ponack

[57] ABSTRACT

The Universal Joint includes a tripod that is to be fixed to the first shaft and a female element that is to be fixed to a second shaft. The tripod has a plurality of arms to engage with the plurality of the tracks of the female element. Two of the tracks are disposed on respective sides of each of the arms of the tripod. Intermediate members are interposed between each one of the arms and the two of the plurality of tracks corresponding thereto. For each one of the arms, the two tracks corresponding thereto include a first track formed of a first slot and a second track. Each one of the arms has a second slot that forms an angle with the first slot of the first track and a first spherical surface. The intermediate members include a first intermediate member that is a ball interacting with the first slot and the second slot, and a second intermediate member interacting with the second track and having a second spherical surface that interacts with the first spherical surface.

12 Claims, 3 Drawing Sheets

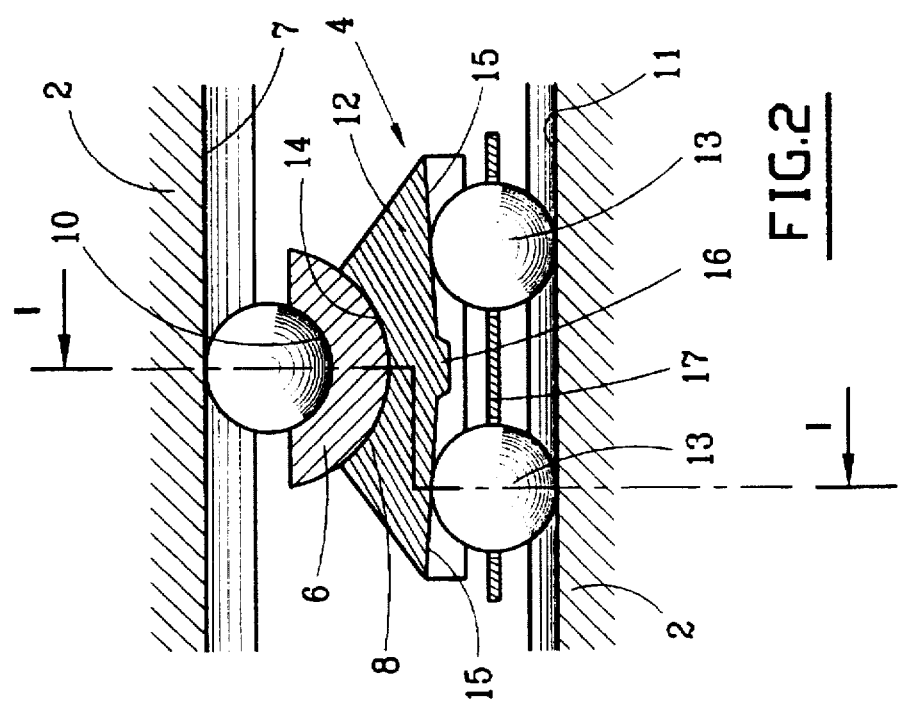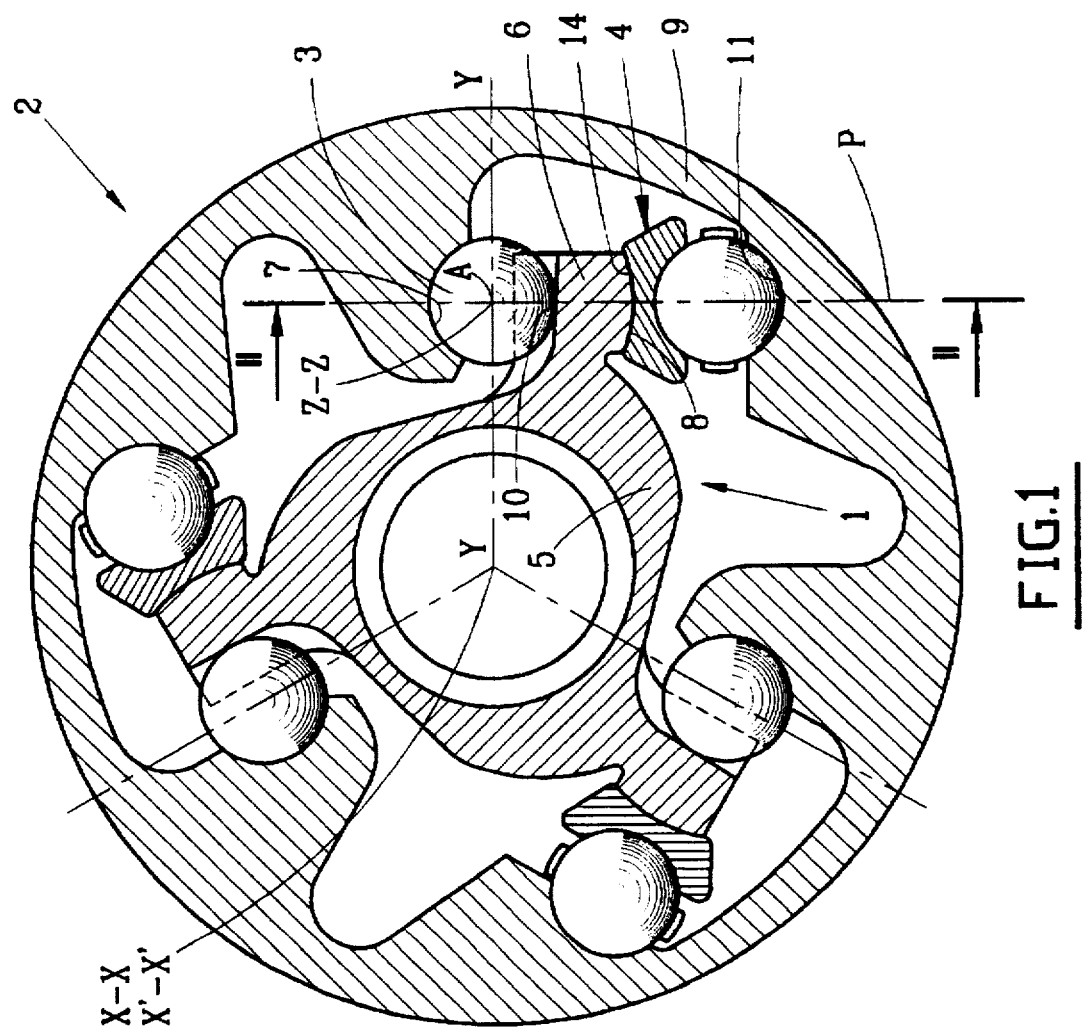

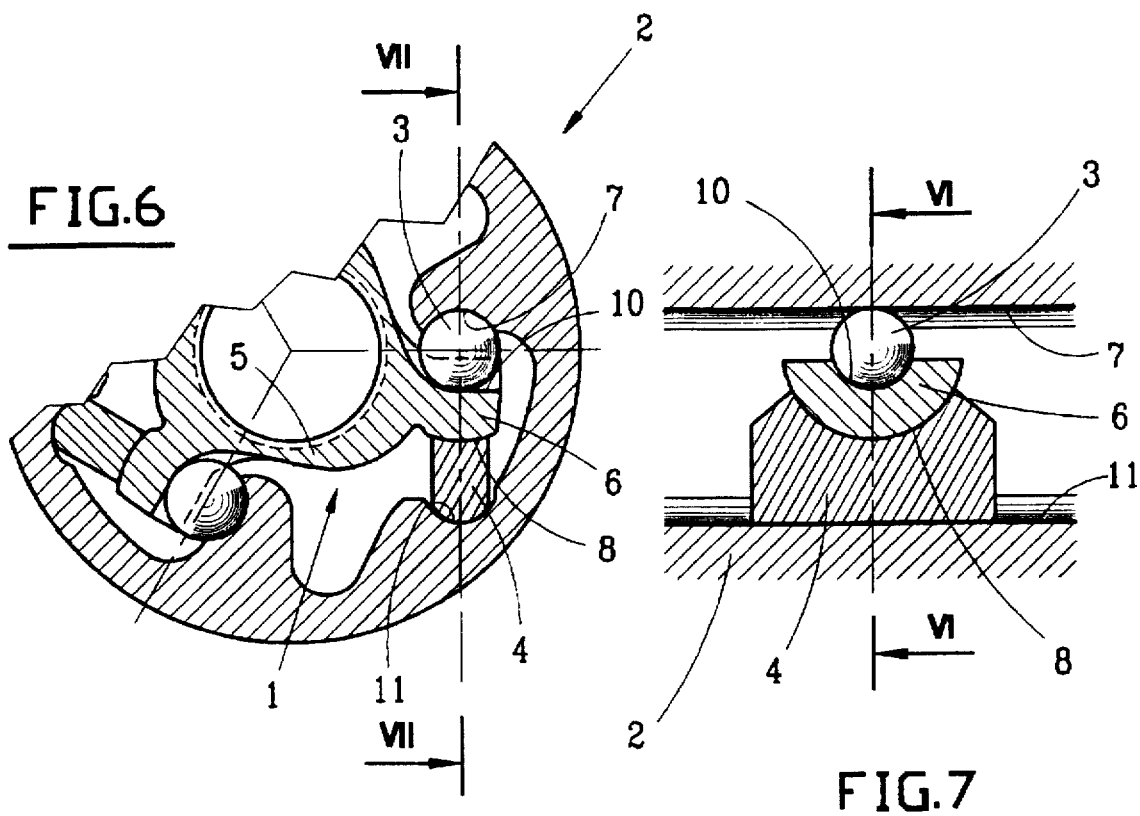
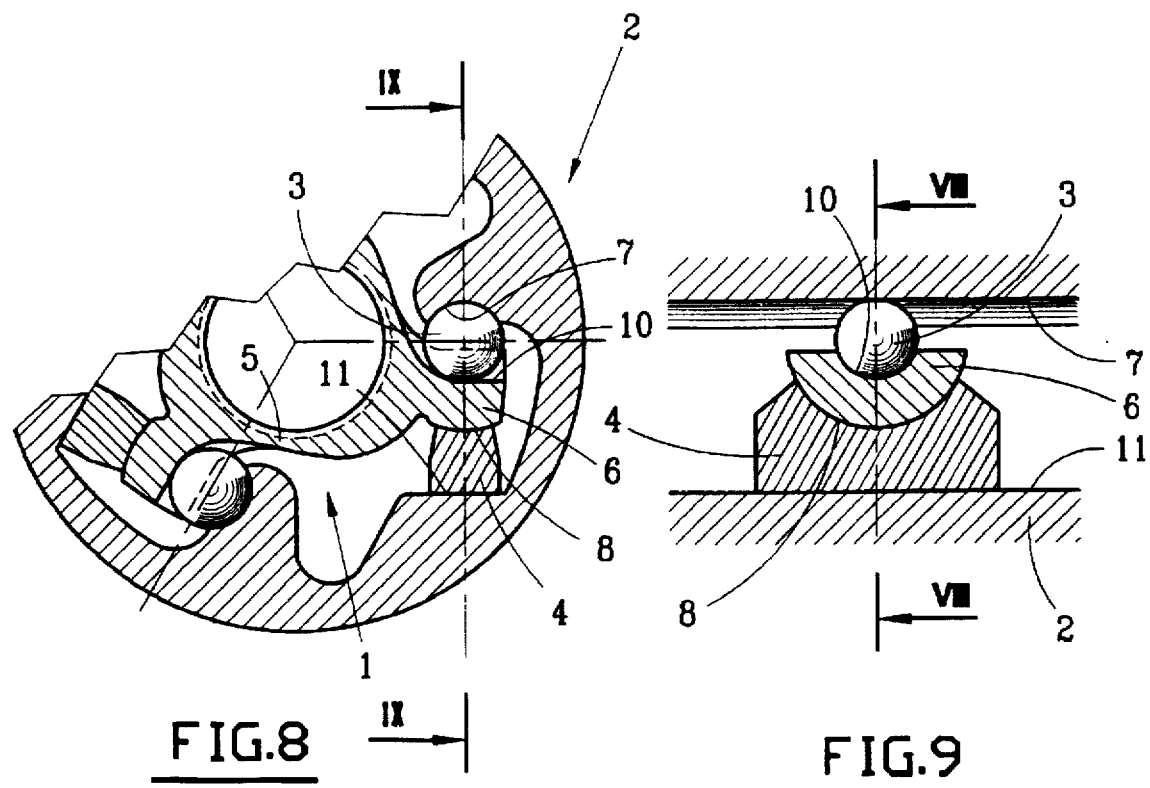

UNIVERSAL JOINT HAVING ARMS OF A TRIPOD INTERACTING WITH TRACKS OF AN OUTER JOINT MEMBER THROUGH TWO DIFFERENT INTERMEDIATE MEMBERS

BACKGROUND OF THE INVENTION

The present invention relates to a sliding universal joint, of the type that comprises: a male element, especially a tripod, intended to be fixed to a first shaft, the male element including arms a female element intended to be fixed to a second shaft and defining two tracks which are respectively situated on both sides of each arm, and intermediate members interposed between each arm and the associated tracks.

In known universal joints of this type, many efforts have been made to reduce the resistance to free axial sliding under torque and at an angle so as to avoid the transmission of vibration to the structure of the vehicle, and to reduce a creation of cyclic axial excitations under torque and at an angle. Effective solutions have been proposed (see, for example, FR-A-2 506 872 and 2 628 803), but these solutions are relatively complex and expensive.

SUMMARY OF THE INVENTION

The object of the present invention is to provide a particularly simple sliding universal joint whose design is better suited to actual operating conditions and makes it possible, at a reduced cost, to obtain satisfactory performance through virtually the entire lifetime of the joint.

To this end, the subject of the invention is a universal joint of the aforementioned type, wherein, facing one side of the arm, the track is a first runway slot, and the intermediate member is a ball which interacts with this slot and with a second slot in the arm, the first slot forming an angle with the second slot. On the other side of the arm, the intermediate member interacts, on the one hand, with the second track and, on the other hand, via a spherical surface, with a spherical surface of the arm.

The universal joint according to the invention may include one or more of the following characteristics.

The director line of the second slot can be contained in a plane perpendicular to the axis of rotation of the male element. The second slot can be straight. The axis of the second slot can also meet the axis of rotation of the male element. The director line of the first slot is a straight line parallel to the axis of rotation of the female element.

The second track can be cylindrical with a circular cross-section, and the corresponding intermediate member comprises, on the one hand, a strip, especially a self-recentering strip, which, on the arm side, has a spherical recess, and on the opposite side has at least one runway path with a circular cross-section and, on the other hand, at least two balls which run along this or these runway paths and along the second track.

The second track can also be plane, with the associated intermediate member being a pad which is spherical on the inside. The outside face is plane and moves along the second track via a row of needles.

The second track can also be a cylindrical slot, and the associated intermediate member is a sector which is spherical on the inside and like a torus on the outside, and runs along this second track.

The second track can further be a cylindrical slot. In this case and the associated intermediate member is a portion which is spherical on the inside and cylindrical on the outside so as to slide in this second track.

the second track is plane, and the associated intermediate member is a pad which is spherical on the inside and has a plane external face sliding directly along this second track.

BRIEF DESCRIPTION OF THE DRAWINGS

Embodiments of the universal joint in accordance with the invention will now be described with respect to the appended drawings, in which:

FIG. 1 is a view in transverse section of a first embodiment of a universal joint according to the invention, taken in section on line I—I of FIG. 2;

FIG. 2 is a view taken in section on line II—II of FIG. 1;

FIG. 6 is a view similar to FIG. 4 of a fourth embodiment of the universal joint according to the invention, taken in section on line VI—VI of FIG. 7;

FIG. 7 is a view taken in section on line VII—VII of FIG. 6;

FIG. 8 is a view similar to FIG. 4 of a fifth embodiment of the universal joint according to the invention, taken in section on line VIII—VIII of FIG. 9; and FIG. 9 is a view taken in section on line IX—IX of FIG. 8.

DETAILED DESCRIPTION OF THE PREFERRED EMBODIMENTS

Figure 3:
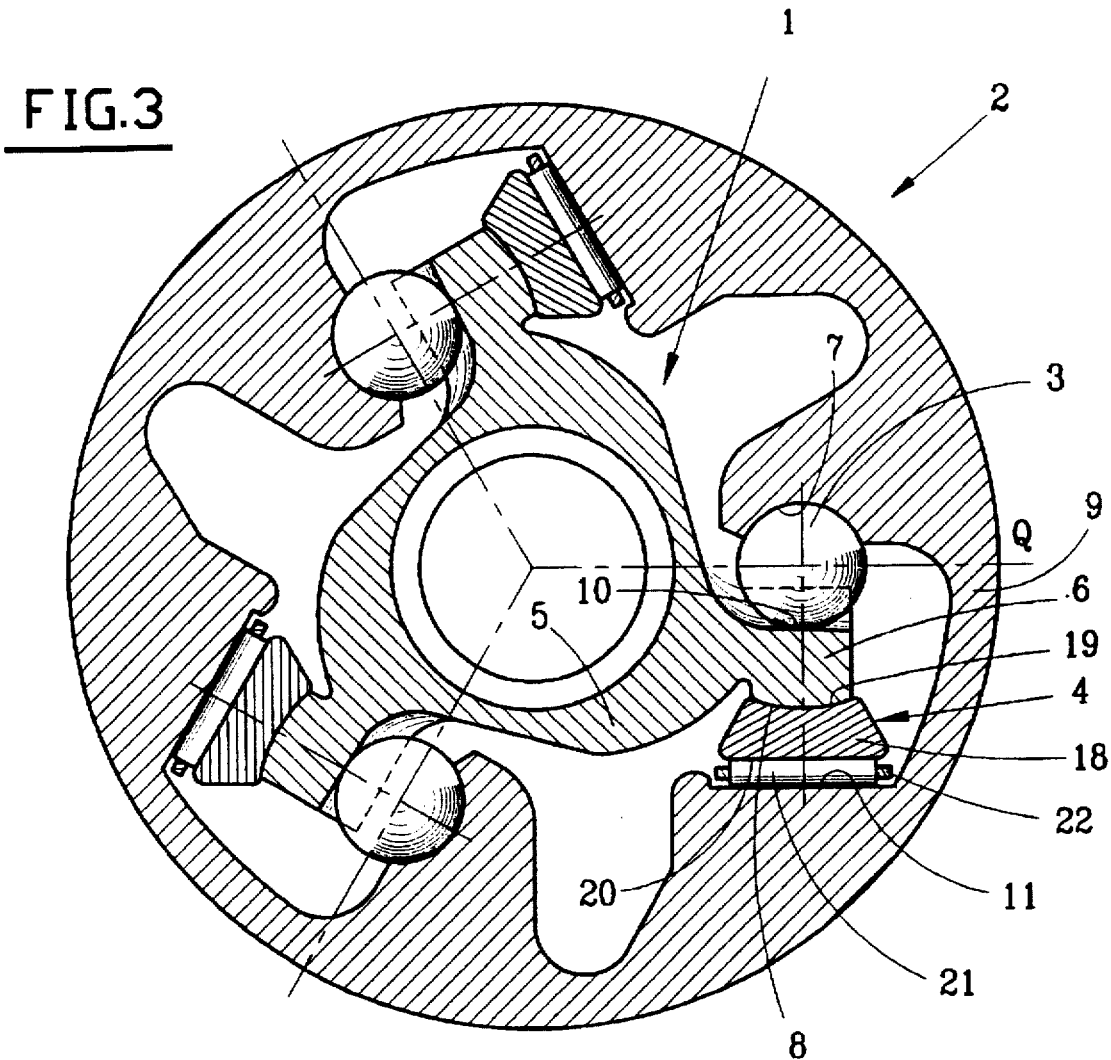
FIG. 3 is a view similar to FIG. 1 of a second embodiment of the universal joint according to the invention.

The universal joint represented in FIGS. 1 and 2 is intended to connect two shafts (not illustrated) which can slide with respect to each other, either in mutual alignment or at an angle of discontinuity which may typically reach approximately 25°. It essentially comprises a male element or tripod 1, a female element or outer joint member 2, three balls 3 and three intermediate members 4.

The tripod is made as a single piece and comprises a central hub 5 designed to be secured to one of the two shafts from which three arms 6, spaced at angles of 120°, radially project. Each arm 6 includes on one side a straight slot 10 with circular cross-section, the axis Y—Y of which orthogonally intersects the axis of rotation X—X of the tripod. On the other side, the opposite side from slot 10, the arm has a spherical surface 8.

The outer joint member 2 forms three lobes 9, each of which internally accommodates an arm 6. Each lobe includes, facing one side of the arm, a straight slot 7 with circular cross-section, the axis Z—Z of which is parallel to the axis X'—X' of the outer joint member. In the aligned position, which is the one represented, the axis Z—Z orthogonally intersects the axis Y—Y of the slot 10. A single ball 3 interacts with the pair of slots 7, 10. The spherical surface 8 is centered at the point of intersection A of the axes Y—Y and Z—Z when the joint is aligned.

Facing the other side of the arm 6, the lobe 9 includes another slot 11 parallel to the slot 7 and situated facing the slot 7. Thus, the plane P defined by a axes of the two slots 7 and 11 is parallel to the axis X'—X' and perpendicular to the axis Y—Y when the joint is aligned.

The intermediate member 4 consists of a self-recentering strip 12 and two balls 13. The strip 12 includes on an inside part thereof spherical recess 14 substantially matching the surface 8 of the arm and interacting with the arm. On the outside the strip 12 includes two runway paths 15 with circular cross-sections and which are separated by a middle projection 16. The paths 15, viewed in plan, are extensions of one another; viewed from the side (FIG. 2), they diverge progressively from the track 11, starting from the projection 16. Each ball 13 is interposed between one of the paths 15 and the track 11, and the shape of the two paths ensures self-recentering of the two balls, as described in FR-A-2 628 803. The assembly 4 is supplemented by a cage 17 for retaining the balls.

The assembly 4 has very low resistance to running, especially under torque and at an angle.

In service, the joint is mounted in a motor-vehicle transmission in such a manner that, in a forward gear, the engine torque is transmitted from the tripod to the outer joint member via the three members 4. Under torque, a slight clearance arises on the side of the ball 3, so that the resistance to sliding is practically that defined by the members 4 and is therefore very low, even at an angle. In other words, in a forward gear, that is to say for virtually all of the operating life of the joint, the level of axial excitations transmitted by the joint to the structure of the vehicle is particularly low.

In reverse gear, it is the resistance to running of the balls 3 which defines the resistance to sliding of the joint. This resistance is greater than that corresponding to a forward gear, but is acceptable given the very short time for which the vehicle operates in reverse gear.

In the example of FIG. 3, the slot 11 is a slot with a plane bottom parallel to the plane Q defined by the axes X'—X' and Z—Z. The member 4 comprises a pad 18 having a spherical internal face 19 substantially matching and interacting with the surface 8 of the arm, and a plane external face 20 moving along the bottom of the slot 11 with the interposition of a row of needles 21. The needles 21 are perpendicular to the axis X'—X' and retained by a cage 22.

This member 4 displays a resistance to running which is almost as low as the member 4 of FIGS. 1 and 2, so that the comments made earlier on the subject of these figures again apply.

Figures 4, 5:
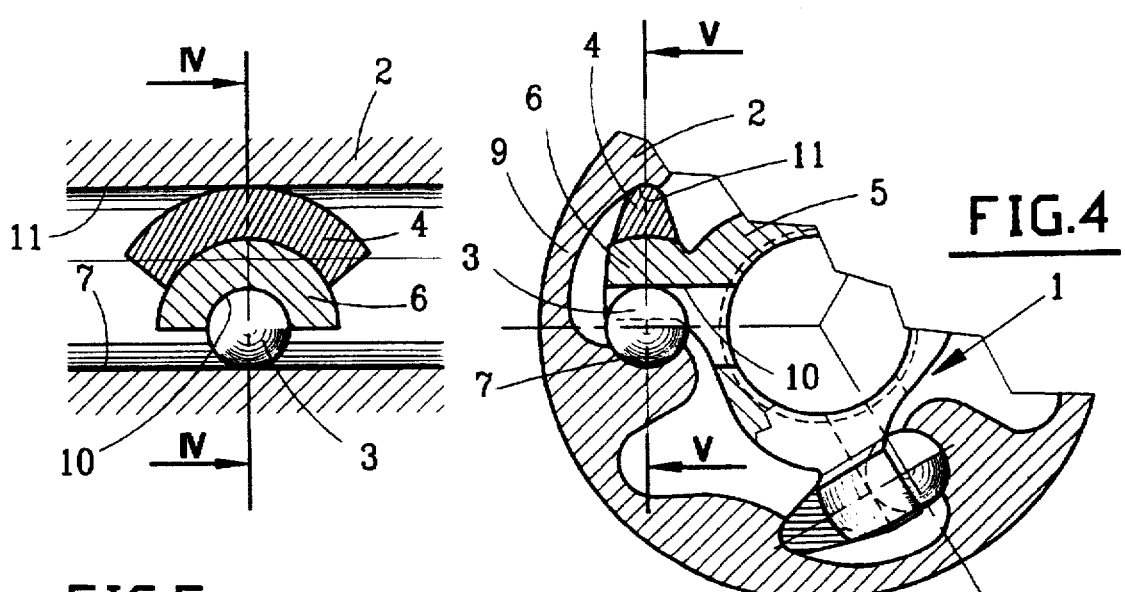
FIG. 4 is a similar partial view of a third embodiment of the universal joint according to the invention, taken in section on line IV—IV of FIG. 5.
FIG. 5 is a view taken in section on the line V—V of FIG. 4.

In the example of FIGS. 4 and 5, the member 4 is a torus sector including a spherical internal face substantially matching and interacting with the surface 8 it, and an external face shaped like a torus substantially matching and interacting with the cylindrical slot 11. In the way, the sector 4 runs along this slot 11 with a resistance to running which is obviously greater than that of the members 4 of FIGS. 1-2 or 3, but still less than that of the ball 3.

In the example of FIGS. 6 and 7, the member 4 is a pad which is spherical on the inside to interact with the surface 8, and cylindrical on the outside to slide in the slot 11, which has a circular cross-section.

The alternative of FIGS. 8 and 9 differs from the previous one in the fact that the slot 11 is replaced by a plane track, whereas the external face of the pad 4 is plane and slides directly along this track.

In the last two examples, it is the ball 3 or the pad 4 which has the lowest resistance to axial movement depending on the dimensions or the technology used to produce it, so that the torque will be transmitted, in a forward gear, in the direction corresponding to the least resistance to axial movement.

What is claimed is:

1. A universal joint, comprising:
   a tripod intended to be fixed to a first shaft, said tripod including a plurality of arms;
   a female element intended to be fixed to a second shaft, said female element comprising a plurality of tracks such that two of said plurality of tracks are disposed on respective sides of each of said arms of said tripod; and
   intermediate members interposed between each one of said arms and said two of said plurality of tracks corresponding thereto;
   wherein for each one of said arms, said two tracks corresponding thereto comprise a first track comprising a first slot and a second track;
   wherein each one of said arms comprises a second slot forming an angle with said first slot of said first track of said two tracks corresponding to the one of said arms and a first spherical surface; and
   wherein said intermediate members include a first intermediate member comprising a ball interacting with said first slot and with said second slot and a second intermediate member interacting with said second track and comprising a second spherical surface interacting with said first spherical surface.

2. The universal joint of claim 1, wherein said tripod has an axis of rotation and said second slot extends in a direction that lies in a plane perpendicular to said axis of rotation.

3. The universal joint of claim 1, wherein said second slot is straight.

4. The universal joint of claim 3, wherein said tripod has an axis of rotation and said second slot has an axis that intersects said axis of rotation.

5. The universal joint of claim 1, wherein said female element has an axis of rotation and said first slot extends in a direction parallel to said axis of rotation.

6. The universal joint of claim 1, wherein:
   said second track is cylindrical and has a partially circular cross-section; and
   said second intermediate member comprises a strip having said second spherical surface formed as a recess on one side thereof and at least one runway path having a partially circular cross-section on an opposite side thereof and at least two balls that are disposed along said at least one runway path and along said second track.

7. The universal joint of claim 6, wherein said at least one runway path comprises two runway paths that progressively diverge from a center point relative to said second track, each of said two runway paths having at least one of said at least two balls disposed there along.

8. The universal joint of claim 1, wherein:
   said second track is plane; and
   said second intermediate member further comprises an outside plane face facing said second track and a plurality of needle bearings between said second track and said outside plane face.

9. The universal joint of claim 1, wherein:
   said second track is cylindrical; and
   said second intermediate member comprises a toric outer surface interacting with said second track.

10. The universal joint of claim 1, wherein:
    said second track is cylindrical; and
    said second intermediate member has a cylindrical outer surface interacting with said second track.

11. The universal joint of claim 1, wherein:
said second track comprises a plane surface; and
said second intermediate member has a plane external face in direct sliding engagement with said second track.

12. The universal joint of claim 1, wherein said first spherical surface is concave and said second spherical surface is convex.

* * * * *